United States Patent

Brun et al.

[15] 3,641,426
[45] Feb. 8, 1972

[54] OPTICAL PUMPING MAGNETOMETERS

[72] Inventors: Henri Brun; Jean-Louis Meilleroux, both of Paris, France

[73] Assignee: Thomson-CSF

[22] Filed: Feb. 25, 1970

[21] Appl. No.: 13,967

[30] Foreign Application Priority Data

Mar. 6, 1969 France.................................6906239

[52] U.S. Cl. .........................................................324/0.5 R
[51] Int. Cl..........................................................G01r 33/08
[58] Field of Search....................324/0.5; 331/3, 94; 330/4.3

[56] References Cited

UNITED STATES PATENTS 3,252,081  5/1966  Ruddock ................................324/0.5

Primary Examiner—Michael J. Lynch
Attorney—Cushman, Darby & Cushman

[57] ABSTRACT

The invention relates to optical pumping magnetometers wherein an absorption cell is optically pumped with a pumping light source emitting two spectrum lines building up a doublet. The magnetometer according to the invention uses an absorption cell filed with a mixture of an alkali vapor and a buffer gas. The efficiency of the optical pumping is increased by insertion between the pumping source and the cell of an optical arrangement capable of circularly polarizing in mutually opposite directions the pumping radiations corresponding to the above-mentioned spectrum lines.

5 Claims, 4 Drawing Figures

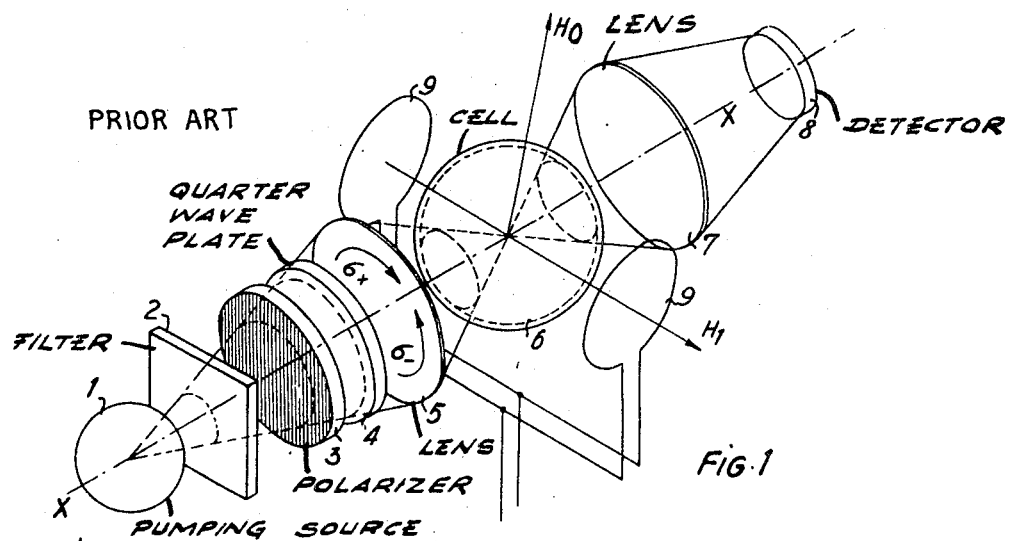
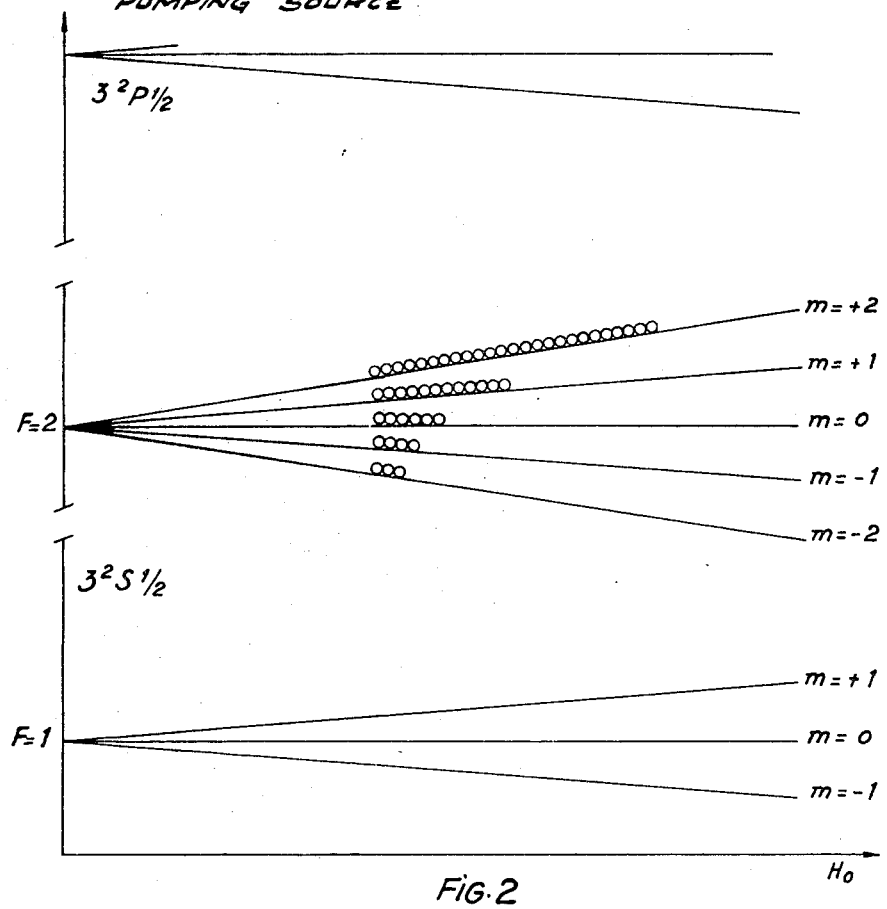

OPTICAL PUMPING MAGNETOMETERS

The present invention relates to optical pumping devices of the kind used to measure the magnitude of a magnetic field by using the quantum levels splitting, known as the Zeeman effect in an alkali element.

The invention relates more particularly to magnetometers comprising an absorption cell in which the alkali element in the vapor state is mixed with a buffer gas. The pumping light sources used for optically aligning the alkali atoms, produce two very closely adjacent spectrum lines. If circularly polarized in the same direction these spectrum lines have opposite actions upon the mixture of alkali vapor and buffer gas filling the absorption cell. This drawback is partially overcome by arranging between the pumping light source and the absorption cell, an interference filter which has different absorption coefficients for the two emitted lines. Nevertheless the presence of such a filter reduces the efficiency of the optical pumping. Also the sensitivity of the optical detection of the radiofrequency transitions increases with the selectivity of the interference filter but it is difficult to obtain a filter which is sufficiently selective to separate two very close spectrum lines.

It is an object of this invention to avoid this drawback.

According to the invention there is provided an optical pumping magnetometer comprising an absorption cell filled with a mixture of an alkali vapor and a buffer gas, a light source for emitting toward said cell a beam of light containing two lines $D_1$ and $D_2$ of the emission spectrum of said vapor and means positioned between said source and said cell on the path of said beam for substantially circularly polarizing in opposite directions of the luminous energies respectively corresponding to said lines $D_1$ and $D_2$.

For a better understanding of the invention and to show how the same may be carried into effect reference will be made to the drawings accompanying the ensuing description and wherein, FIG. 1 illustrates an optical pumping device for the optical detection of radiofrequency transitions in an alkali vapor;

FIG. 2 is an explanatory diagram;

Figure 3:
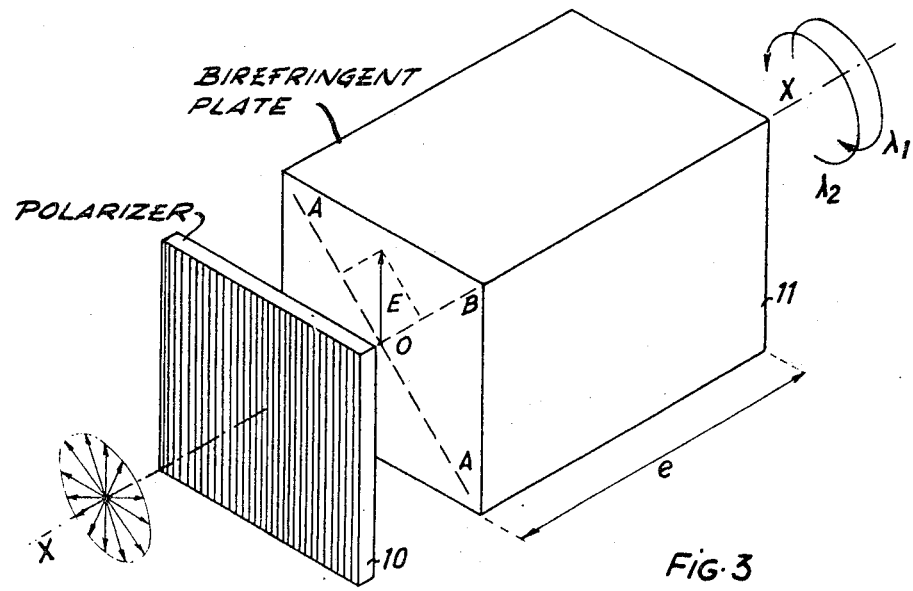
FIG. 3 is an explanatory figure.

In FIG. 1, there can be seen an optical pumping device which makes it possible to detect optically the radiofrequency spectrum lines in an alkali vapor. This device comprises a pumping light source 1 and an absorption cell 6. The cell 6 contains an alkali element, the vapor of which is mixed with a buffer gas in order to preserve the alignment of the alkali atoms, since it can be altered upon collisions of the latter with the cell walls. The source 1 emits in the direction of the cell 6, a light beam containing within its spectrum the lines $D_1$ and $D_2$ of the emissive spectrum of the alkali element; this beam passes through an interference filter 2 which selectively transmits one of the said emitted lines; the filter 2 is followed by a rectilinear polarizer 3 and by a quarter wave plate 4 for circularly polarizing in the direction $\sigma+$ or $\sigma-$ the light received by the lens 5 which follows. The lens 5 concentrates the circularly polarized light on the cell 6 and the beam which emerges therefrom is in turn concentrated by a lens 7 on a photoelectric detector 8. An inductor device 9 produces an alternating field $H_1$ which is superimposed upon the magnetic field $H_0$ existing inside the cell 6. For the sake of clarity the electric circuits connected to the inductor 9 and to the photoelectric transducer 8 have not been shown in FIG. 1. These circuits are designed to produce in the resonance cell 6, a field $H_1$ whose frequency $f$ coincides with the center frequency $f_0$ of the absorption lines of the alkali element.

If the frequency $f$ of the field $H_1$ is made to scan a narrow range of frequencies centered about $f_0$, the cell 6 will more or less strongly modulate the light radiation received by the photoelectric transducer 8. In order to obtain accurate blocking of the frequency $f$ on the frequency $f_0$, it is necessary that the optical modulation should be as strong as possible. This conditions is not fully realized in the device of FIG. 1. To understand this, it is necessary to explain the optical processes of pumping and detection, bearing in mind the existence of the two spectrum lines $D_1$ and $D_2$ and the two directions $\sigma+$ and $\sigma-$ which the light radiation fractions passing through the cell 6, can have.

FIG. 2 illustrates, in the case of sodium vapor, the quantum levels of the ground state $3^2S\,\tfrac{1}{2}$ and the excited state $3^2P\tfrac{1}{2}$. Under the action of the field $H_0$, the latter being plotted on the abscissae, the hyperfine structure levels F=1 and F=2 are split respectively into three and five sublevels, the magnetic quantum numbers of which are $m=+1, 0, -1$ and $m=+2, +1, 0, -1, -2$. In the absence of any optical pumping, the sublevels of the ground state have substantially the same atomic populations by reason of Boltzmann's equipartition law. These populations become dissimilar under the action of the pumping light which causes optical transitions to the excited state with subsequent return to the ground state. In FIG. 2, the net result of the optical pumping exerted by the spectrum line $D_1$, polarized in the $\sigma+$ direction, has been sketched. Each sublevel of the hyperfine structure level F=2 has an atomic population which increases starting from the sublevel $m=-2$. The increase in the population of the sublevel $m=+2$ at the expense of the sublevel $m=-2$, is explained by the following chart which sets out, as a function of the characteristics of the pumping light, the relative probability of transition to the excited state for the atoms occupying the sublevels of the ground state.

| Designation of the sublevels | Spectrum line $D_1$ | | Spectrum line $D_2$ | |
|---|---|---|---|---|
| | + | − | + | − |
| F=2, m=+2 | 0 | 4 | 6 | 2 |
| F=2, m=+1 | 1 | 3 | 5 | 3 |
| F=2, m=0  | 2 | 2 | 4 | 4 |
| F=2, m=−1 | 3 | 1 | 3 | 5 |
| F=2, m=−2 | 4 | 0 | 2 | 6 |
| F=1, m=+1 | 3 | 1 | 3 | 5 |
| F=1, m=0  | 2 | 2 | 4 | 4 |
| F=1, m=−1 | 1 | 3 | 5 | 3 |

From this chart, it will be seen that the use of the spectrum line $D_1$, polarized in the $\sigma+$ direction, causes the sublevel F=2, $m=+2$ to depopulate at smaller rate than the sublevel F=2, $m=-2$, a state which will be referred as corresponding to "-positive polarization" $\langle S_3 \rangle$. The same chart shows that the spectrum line $D_2$, polarized in the $\sigma+$ direction, causes the sublevel F=2, $m=-2$ to depopulate at a smaller rate than the sublevel F=2, $m=+2$, thus creating what will be termed a "-negative polarization" $\langle S_3 \rangle$. This is why the interference filter 2 is necessary in the optical device of FIG. 1: it is necessary to arrange that the optical pumping may not take place with two spectrum lines $D_1$ and $D_2$ of equal intensity and identical direction of polarization, since the consequence of this is that one of the spectrum lines would neutralize the polarization state created in the vapor by the other.

In addition, disregarding the fact that no optical pumping takes place in the presence of both spectrum lines $D_1$ and $D_2$ circularly polarized in the same sense, and assuming that optical pumping has still taken place and considering the optical detection of the radiofrequency spectrum lines of sodium in itself, the presence of both lines $D_1$ and $D_2$, circularly polarized in the same sense, is likewise undesired. In other words, even if optical pumping had created an increase in the population of the sublevel F=2, $m=+2$, and a depopulation of the sublevel F=2, $m=-2$, it will be seen from the foregoing chart that the spectrum $D_2$ is more heavily absorbed by the vapor than is the spectrum line $D_1$. If the resonance field $H_1$ has a frequency $f$ which coincides with the frequency $f_0$ corresponding to transitions between sublevels, the populations will tend to equalize and the result is that the spectrum line $D_1$ would be absorbed to a greater extent while the spectrum line $D_2$ is absorbed to a lesser one; on the whole, the two effects compensate one another and the photoelectric transducer 8 will detect no variation in luminous intensity.

As already mentioned at the outset of the present specification these drawbacks are only partly eliminated by the arrangement of FIG. 1 and it is an object of this invention to achieve this in a better manner.

To this end the invention eliminates the interference filter 2 and substitutes for the quarter-wave plate 4 a birefringent plate whose thickness is selected to supply at its exit face radiations $D_1$ and $D_2$ whose directions of circular polarization are the opposite of one another. It will be seen from the foregoing chart that, the pumping effects of the two spectrum lines $D_1$ and $D_2$ are then additive and so are the optical detection effects.

FIG. 3, shows a circular polarization device for simultaneously transforming the radiation $D_1$ and $D_2$ of distinct wavelengths $\lambda_1$ and $\lambda_2$, into circularly polarized light waves of mutually opposite directions of polarization. The device comprises a rectilinear polarizer 10 followed by a birefringent plate 11 having a thickness $e$ and two neutral axes $oA$ and $oB$ inclined at 45° to the electrical vector $E$ of the wave emerging from the rectilinear polarizer 10. In order, to obtain at the output of the plate 11, waves which are circularly polarized in mutually opposite directions, it is necessary that the $oA$ and $oB$ components of the electrical vector $E$ should undergo differential phase shifts $\Delta\phi_1$ and $\Delta\phi_2$ which are defined by the following relationships:

$$\Delta\phi_1 = 2k_1\pi - \pi/2 \text{ and } \Delta\phi_2 = 2k_2\pi + \pi/2,$$

where $k_1$ and $k_2$ are positive whole numbers.

If $n_e$ is the extraordinary index of the plate 11 and if $n_o$ is the ordinary index, then one has:

$$\Delta\phi_1 = 2\pi e \Delta n/1$$
$$\Delta\phi_2 = 2\pi e \Delta n/2$$

where $\Delta n$ is the differential index $\Delta n = n_e - n_o$, $\lambda_1$ is the wavelength in vacuum, of the spectrum line $D_1$ and $\lambda_2$ is the wavelength in vacuum, of the spectrum line $D_2$.

Using the relationships set out hereinbefore, it will be seen that the plate 11 must satisfy the condition:

$$(k_1 - \tfrac{1}{4})\lambda_1 = (k_2 + \tfrac{1}{4})\lambda_2$$

Knowing $\lambda_1$ and $\lambda_2$, it is easy to find positive whole numbers $k_1$ and $k_2$ which will substantially satisfy this condition.

By way of example, if the alkali element used is cesium, the spectrum lines $D_1$ and $D_2$ have wavelengths of:

$$\lambda_1 = 8943 \text{ A.}, \lambda_2 = 8521 \text{ A.}$$

The numbers $k_1 = 30$ and $k_2 = 31$ satisfy the above-mentioned condition, with a high degree of accuracy. It will than be seen that the thickness $e$ of the plate 11 should be 3008 $\mu$, if it is cut parallel to the optical axis in a quartz crystal for which $\Delta n = 0.00885$.

A smaller value of the thickness $e$ can be used since it is acceptable in practice that the polarizations at the exit from the plate 11, should not be strictly circular. In this case, the condition is simplified by putting $k = k_1 = k_2$, and one then has:

$$k = \tfrac{1}{4}(\lambda_2 + \lambda_1)/(\lambda_1 - \lambda_2).$$

At the wavelengths mentioned above, one has $k = 10.3$.

By taking $k = 10$, one obtains a thickness $e$ of 986 $\mu$; with this thickness a circular polarization in obtained for the spectrum line $D_1$. For the spectrum line $D_2$ the polarization is substantially circular.

Figure 4:
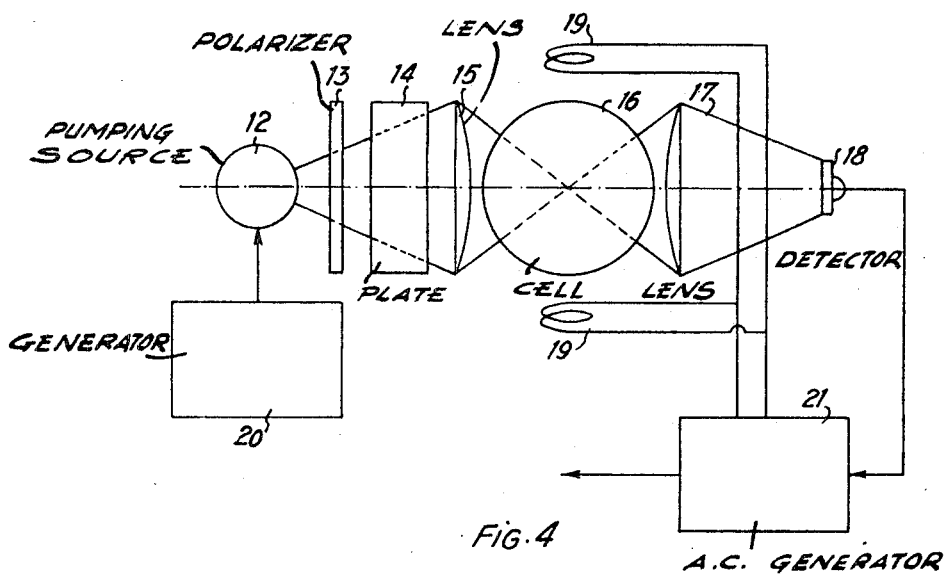
FIG. 4 illustrates the diagram of a magnetometer in accordance with the invention.

FIG. 4, shows diagrammatically an optical pumping device in accordance with the invention. This device comprises a pumping light source 12 supplied by an electrical generator 20, a rectilinear polarizer 13, a birefringent plate 14, a first lens 15, a resonance cell 16, a second lens 17, a photoelectric transducer 18, inductors 19 and a circuit 21 for applying to the inductors 19 an alternating voltage the frequency $f$ of which is locked to the center frequency $f_o$ of one of the absorption lines of the alkali vapor contained in the cell 16.

The birefringent plate has its neutral axes orientated at 45° to the direction of polarization of the polarizer 13; its thickness is selected for circularly polarizing in mutually opposite directions, the two spectrum lines $D_1$ and $D_2$ emitted by the source 12. The spectrum lines $D_1$ and $D_2$, polarized by the plate 14, are additive in terms of their pumping effects on the alkali vapor enclosed in the cell 16. If the frequency $f$ produced by the circuit 21 coincides with the frequency $f_o$, the polarized spectrum lines $D_1$ and $D_2$ experience absorption on passage through the alkali vapor; this makes it possible to detect clearly, by means of the transducer 18, any frequency shift between $f$ and $f_o$.

Without departing from the scope of the present invention, it is possible to arrange the photoelectric transducer in such fashion as to pick up the light diffused by the vapor; in this case, a maximum voltage is obtained at the output of the transducer when the frequency $f$ coincides with $f_o$.

What is claimed is:

1. An optical pumping magnetometer comprising an absorption cell filled with a mixture of an alkali vapor and a buffer gas, a light source for emitting toward said cell a beam of light containing two lines $D_1$ and $D_2$ of the emission spectrum of said vapor, means positioned between said source and said cell, on the path of said beam, for substantially circularly polarizing in opposite directions the luminous energies respectively corresponding to said lines $D_1$ and $D_2$, means for applying an RF magnetic field to said cell, radiation detector means positioned for receiving light emerging from said cell, and readout means.

2. An optical pumping magnetometer as claimed in claim 1, wherein said circularly polarizing means comprise: a rectilinear polarizer receiving the light emerging from said source and a birefringent plate for receiving the rectilinearly polarized luminous energy emerging from said polarizer; said plate having its neutral axes at an angle of 45° with respect to the polarization direction of said polarized luminous energy and a thickness adjusted for converting said polarized energy into said circularly polarized luminous energies of opposite directions.

3. An optical pumping magnetometer as claimed in claim 2, wherein said plate has two parallel faces cut in a birefringent material having an ordinary and an extraordinary index of refraction differing from each other by the quantity $\Delta n$; said lines $D_1$ and $D_2$ having respective wavelengths $\lambda_1$ and $\lambda_2$; the distance between said faces being substantially equal to both $(k_1 - \tfrac{1}{4})\lambda_1/\Delta n$ and $(k_2 - \tfrac{1}{4})\lambda_2/\Delta n$, $k_1$ and $k_2$ being two positive whole numbers.

4. An optical pumping magnetometer as claimed in claim 3, wherein said numbers $k_1$ and $k_2$ are equal.

5. An optical pumping magnetometer as claimed in claim 3, wherein said alkali vapor is cesium and said birefringent material is quartz.

* * * * *